(12) United States Patent
Dickinson et al.

(10) Patent No.: US 9,390,615 B2
(45) Date of Patent: Jul. 12, 2016

(54) EMERGENCY ALERT FOR VOICE OVER INTERNET PROTOCOL (VOIP)

(75) Inventors: Richard Dickinson, Seattle, WA (US); Don Mitchell, Bellevue, WA (US); Jonathan Croy, Seattle, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 594 days.

(21) Appl. No.: 12/923,142

(22) Filed: Sep. 3, 2010

(65) Prior Publication Data

US 2011/0019664 A1 Jan. 27, 2011

Related U.S. Application Data

(63) Continuation of application No. 11/508,283, filed on Aug. 23, 2006, now Pat. No. 7,933,385.

(60) Provisional application No. 60/711,435, filed on Aug. 26, 2005.

(51) Int. Cl.
*H04M 11/04* (2006.01)
*G08B 27/00* (2006.01)
(Continued)

(52) U.S. Cl.
CPC ......... *G08B 27/005* (2013.01); *H04M 3/42357* (2013.01); *H04M 3/53375* (2013.01); *H04M 7/006* (2013.01); *H04M 7/0075* (2013.01); *H04M 3/424* (2013.01); *H04M 3/5116* (2013.01); *H04M 3/5158* (2013.01); *H04M 3/5322* (2013.01); *H04M 2201/14* (2013.01); *H04M 2201/39* (2013.01); *H04M 2201/52* (2013.01);
(Continued)

(58) Field of Classification Search
CPC .................................................. H04M 2242/14
USPC ........................... 379/45, 88.17, 88.25, 93.01
See application file for complete search history.

(56) References Cited

U.S. PATENT DOCUMENTS

| 1,103,073 A | 7/1914 | O'Connel |
| 4,445,118 A | 4/1984 | Taylor et al. |

(Continued)

FOREIGN PATENT DOCUMENTS

| WO | WO99/21380 | 4/1999 |
| WO | WO01/45342 | 6/2001 |

(Continued)

OTHER PUBLICATIONS http://en.wikipedia.org/wiki/imsi, Wikipedia Encyclopedia, International Mobile Subscriber Identity, pp. 1-4, printed on Sep. 4, 2008.

(Continued)

*Primary Examiner* — Joseph T Phan
(74) *Attorney, Agent, or Firm* — Tarolli, Sundheim, Covell & Tummino LLP

(57) ABSTRACT

A voice over Internet Protocol (VoIP) positioning center (VPC) is implemented in configuration with support from a text-to-voice module, emergency routing database, and VoIP switching points (VSPs) to allow a public safety access point (PSAP) or other emergency center to effectively communicate the nature of an emergency alert notification and the area of notification to the VoIP positioning center (VPC). The inventive VPC in turn determines which phones (including wireless and/or VoIP phones) are currently in the area for notification, and reliably and quickly issues the required warning to all affected wireless and VoIP phones.

9 Claims, 2 Drawing Sheets

(51) Int. Cl.
  *H04M 3/42*      (2006.01)
  *H04M 3/533*     (2006.01)
  *H04M 7/00*      (2006.01)
  *H04M 3/424*     (2006.01)
  *H04M 3/51*      (2006.01)
  *H04M 3/53*      (2006.01)

(52) U.S. Cl.
  CPC . *H04M 2203/205* (2013.01); *H04M 2203/2016* (2013.01); *H04M 2242/04* (2013.01); *H04M 2242/14* (2013.01)

(56) References Cited

U.S. PATENT DOCUMENTS

| | | | |
|---|---|---|---|
| 4,494,119 A | 1/1985 | Wimbush | |
| 4,651,156 A | 3/1987 | Martinez | |
| 4,891,638 A | 1/1990 | Davis | |
| 4,891,650 A | 1/1990 | Sheffer | |
| 4,952,928 A | 8/1990 | Carroll | |
| 4,972,484 A | 11/1990 | Theile | |
| 5,014,206 A | 5/1991 | Scribner | |
| 5,043,736 A | 8/1991 | Darnell | |
| 5,055,851 A | 10/1991 | Sheffer | |
| 5,068,656 A | 11/1991 | Sutherland | |
| 5,166,972 A | 11/1992 | Smith | |
| 5,712,900 A | 1/1998 | Maupin | |
| 5,937,344 A | 8/1999 | Zicker | |
| 6,108,533 A | 8/2000 | Brohoff | |
| 6,275,937 B1 | 8/2001 | Hailpern | |
| 6,427,001 B1 | 7/2002 | Contractor | |
| 6,526,026 B1 | 2/2003 | Menon | |
| 6,529,500 B1 | 3/2003 | Pandharipande | |
| 6,529,722 B1 | 3/2003 | Heinrich | |
| 6,535,743 B1 | 3/2003 | Kennedy, III | |
| 6,539,232 B2 | 3/2003 | Hendrey et al. | |
| 6,556,816 B1 | 4/2003 | Gafrick | |
| 6,564,261 B1 | 5/2003 | Gudjonsson | |
| 6,675,017 B1 | 1/2004 | Zellner | |
| 6,694,351 B1 | 2/2004 | Shaffer | |
| 6,721,396 B2 | 4/2004 | Chin | |
| 6,731,940 B1 | 5/2004 | Nagendran | |
| 6,744,858 B1 | 6/2004 | Ryan | |
| 6,771,639 B1 | 8/2004 | Holden et al. | |
| 6,771,742 B2 * | 8/2004 | McCalmont et al. | 379/45 |
| 6,775,267 B1 | 8/2004 | Kung | |
| 6,775,534 B2 | 8/2004 | Lindgren | |
| 6,795,444 B1 | 9/2004 | Vo | |
| 6,813,264 B2 | 11/2004 | Vassilovski | |
| 6,816,878 B1 * | 11/2004 | Zimmers | G08B 27/005 340/540 |
| 6,839,417 B2 | 1/2005 | Weisman | |
| 6,847,618 B2 | 1/2005 | Laursen | |
| 6,865,266 B1 | 3/2005 | Pershan | |
| 6,876,734 B1 | 4/2005 | Summers | |
| 6,882,850 B2 | 4/2005 | McConnell et al. | |
| 6,912,230 B1 | 6/2005 | Salkini | |
| 6,925,504 B1 | 8/2005 | Liskov | |
| 6,940,826 B1 | 9/2005 | Simard | |
| 6,940,950 B2 | 9/2005 | Dickinson et al. | |
| 6,968,044 B2 | 11/2005 | Beason | |
| 6,985,747 B2 | 1/2006 | Chithambaram | |
| 6,990,081 B2 | 1/2006 | Schaefer et al. | |
| 6,993,355 B1 | 1/2006 | Pershan | |
| 7,031,724 B2 | 4/2006 | Ross | |
| 7,130,630 B1 | 10/2006 | Enzmann | |
| 7,136,466 B1 | 11/2006 | Gao | |
| 7,171,220 B2 | 1/2007 | Belcea | |
| 7,174,153 B2 | 2/2007 | Ehlers | |
| 7,177,397 B2 | 2/2007 | McCalmont | |
| 7,177,398 B2 | 2/2007 | Meer | |
| 7,177,399 B2 | 2/2007 | Dawson | |
| 7,184,418 B1 | 2/2007 | Baba | |
| 7,200,380 B2 | 4/2007 | Havlark | |
| 7,245,900 B1 | 7/2007 | Lamb | |
| 7,260,186 B2 | 8/2007 | Zhu | |
| 7,260,384 B2 | 8/2007 | Bales et al. | |
| 7,269,428 B1 | 9/2007 | Wallenius | |
| 7,277,938 B2 | 10/2007 | Duimovich | |
| 7,321,773 B2 | 1/2008 | Hines | |
| 7,333,480 B1 | 2/2008 | Clarke | |
| 7,366,157 B1 | 4/2008 | Valentine | |
| 7,369,508 B2 | 5/2008 | Parantainen | |
| 7,369,530 B2 | 5/2008 | Keagy | |
| 7,382,773 B2 | 6/2008 | Schoeneberger | |
| 7,394,896 B2 | 7/2008 | Norton | |
| 7,412,049 B1 | 8/2008 | Koch | |
| 7,428,571 B2 | 9/2008 | Ichimura | |
| 7,436,785 B1 | 10/2008 | McMullen | |
| 7,440,442 B2 | 10/2008 | Grabelsky et al. | |
| 7,453,990 B2 | 11/2008 | Welenson | |
| 7,516,198 B1 | 4/2009 | Appala | |
| 7,519,353 B2 | 4/2009 | Stevens | |
| 7,526,563 B2 | 4/2009 | Ingimundarson | |
| 7,573,982 B2 | 8/2009 | Breen | |
| 7,602,886 B1 | 10/2009 | Beech | |
| 7,617,287 B2 * | 11/2009 | Vella et al. | 709/207 |
| 7,627,331 B2 | 12/2009 | Winterbottom | |
| 7,664,233 B1 * | 2/2010 | Kirchmeier | G06Q 10/06 379/37 |
| 7,684,782 B2 | 3/2010 | Ashley | |
| 7,702,081 B1 | 4/2010 | Klesper | |
| 7,751,826 B2 | 7/2010 | Gardner | |
| 7,783,297 B2 | 8/2010 | Ishii | |
| 7,787,611 B1 | 8/2010 | Kotelly | |
| 7,822,391 B1 | 10/2010 | Delker | |
| 7,822,871 B2 | 10/2010 | Stolorz | |
| 7,895,263 B1 | 2/2011 | Kirchmeier | |
| 2001/0021646 A1 | 9/2001 | Antonucci | |
| 2001/0040886 A1 | 11/2001 | Jimenez | |
| 2002/0055924 A1 | 5/2002 | Liming | |
| 2002/0058515 A1 | 5/2002 | Holler | |
| 2002/0069079 A1 | 6/2002 | Vega | |
| 2002/0085538 A1 | 7/2002 | Leung | |
| 2002/0086659 A1 | 7/2002 | Lauper | |
| 2002/0086676 A1 | 7/2002 | Hendry | |
| 2002/0099802 A1 | 7/2002 | Marsh | |
| 2002/0113797 A1 | 8/2002 | Potter | |
| 2002/0118650 A1 | 8/2002 | Jagadeesan | |
| 2002/0118796 A1 | 8/2002 | Menard | |
| 2002/0126656 A1 | 9/2002 | Park | |
| 2002/0136364 A1 | 9/2002 | Stumer | |
| 2002/0141386 A1 | 10/2002 | Minert | |
| 2002/0154221 A1 | 10/2002 | Ishimaru | |
| 2002/0174073 A1 | 11/2002 | Nordman | |
| 2002/0191595 A1 | 12/2002 | Mar | |
| 2003/0012148 A1 | 1/2003 | Peters | |
| 2003/0026245 A1 | 2/2003 | Ejzak | |
| 2003/0044654 A1 | 3/2003 | Holt | |
| 2003/0063714 A1 | 4/2003 | Stumer | |
| 2003/0063730 A1 | 4/2003 | Woodring | |
| 2003/0069002 A1 | 4/2003 | Hunter et al. | |
| 2003/0081752 A1 | 5/2003 | Trandal | |
| 2003/0081754 A1 | 5/2003 | Esparza | |
| 2003/0086539 A1 | 5/2003 | McCalmont | |
| 2003/0096623 A1 | 5/2003 | Kim | |
| 2003/0108176 A1 | 6/2003 | Kung | |
| 2003/0109245 A1 | 6/2003 | McCalmont | |
| 2003/0118160 A1 | 6/2003 | Holt | |
| 2003/0135493 A1 | 7/2003 | Phelan | |
| 2003/0148757 A1 | 8/2003 | Meer | |
| 2003/0163483 A1 | 8/2003 | Zingher | |
| 2003/0186709 A1 | 10/2003 | Rhodes | |
| 2003/0187803 A1 | 10/2003 | Pitt | |
| 2003/0222901 A1 | 12/2003 | Houck | |
| 2004/0032485 A1 | 2/2004 | Stephens | |
| 2004/0043775 A1 | 3/2004 | Kennedy | |
| 2004/0047461 A1 | 3/2004 | Weisman | |
| 2004/0064500 A1 | 4/2004 | Kolar et al. | |
| 2004/0076277 A1 | 4/2004 | Kuusinen | |
| 2004/0078694 A1 | 4/2004 | Lester | |
| 2004/0093217 A1 | 5/2004 | Yeh | |
| 2004/0097243 A1 | 5/2004 | Zellner | |
| 2004/0107143 A1 | 6/2004 | Niemi | |

(56) References Cited

U.S. PATENT DOCUMENTS

| | | |
|---|---|---|
| 2004/0150518 A1* | 8/2004 | Phillips et al. ............... 340/500 |
| 2004/0152493 A1* | 8/2004 | Phillips et al. ............... 455/567 |
| 2004/0156394 A1 | 8/2004 | Westman |
| 2004/0157175 A1 | 8/2004 | Matsumoto |
| 2004/0176123 A1 | 9/2004 | Chin |
| 2004/0180671 A1 | 9/2004 | Spain |
| 2004/0181689 A1 | 9/2004 | Kiyoto |
| 2004/0184584 A1 | 9/2004 | McCalmont |
| 2004/0190497 A1 | 9/2004 | Knox |
| 2004/0192271 A1 | 9/2004 | Eisner |
| 2004/0198386 A1 | 10/2004 | Dupray |
| 2004/0203568 A1 | 10/2004 | Kirtland |
| 2004/0203575 A1 | 10/2004 | Chin |
| 2004/0203732 A1 | 10/2004 | Brusilovsky |
| 2004/0203919 A1 | 10/2004 | Ross |
| 2004/0242191 A1 | 12/2004 | Hossain |
| 2004/0258021 A1 | 12/2004 | Kashimoto |
| 2004/0267445 A1 | 12/2004 | De Luca |
| 2005/0003797 A1* | 1/2005 | Baldwin ............... 455/404.1 |
| 2005/0021769 A1 | 1/2005 | Kim |
| 2005/0030977 A1* | 2/2005 | Casey et al. ............... 370/485 |
| 2005/0031095 A1 | 2/2005 | Pietrowicz |
| 2005/0039135 A1 | 2/2005 | Othmer |
| 2005/0047399 A1 | 3/2005 | Lee et al. |
| 2005/0048987 A1 | 3/2005 | Glass |
| 2005/0053209 A1 | 3/2005 | D'Evelyn |
| 2005/0063519 A1 | 3/2005 | James |
| 2005/0071251 A1 | 3/2005 | Linden |
| 2005/0074107 A1 | 4/2005 | Renner |
| 2005/0078612 A1 | 4/2005 | Lang |
| 2005/0083911 A1 | 4/2005 | Grabelsky |
| 2005/0085257 A1 | 4/2005 | Laird |
| 2005/0101335 A1 | 5/2005 | Kelly |
| 2005/0107673 A1 | 5/2005 | Ball |
| 2005/0111630 A1 | 5/2005 | Potorney |
| 2005/0135569 A1 | 6/2005 | Dickinson |
| 2005/0136885 A1 | 6/2005 | Kaltsukis |
| 2005/0144322 A1 | 6/2005 | Miyajima |
| 2005/0169248 A1 | 8/2005 | Truesdale |
| 2005/0174991 A1 | 8/2005 | Keagy |
| 2005/0186937 A1 | 8/2005 | Graham |
| 2005/0188078 A1 | 8/2005 | Kotzin |
| 2005/0190892 A1 | 9/2005 | Dawson |
| 2005/0192822 A1 | 9/2005 | Hartenstein |
| 2005/0195954 A1 | 9/2005 | Klein |
| 2005/0201358 A1 | 9/2005 | Nelson |
| 2005/0201528 A1 | 9/2005 | Meer |
| 2005/0201529 A1 | 9/2005 | Nelson |
| 2005/0202799 A1 | 9/2005 | Rollender |
| 2005/0213537 A1 | 9/2005 | Ingimundarson et al. |
| 2005/0213716 A1 | 9/2005 | Zhu |
| 2005/0215233 A1 | 9/2005 | Perera |
| 2005/0216300 A1 | 9/2005 | Appelman |
| 2005/0222908 A1 | 10/2005 | Altberg |
| 2005/0232252 A1 | 10/2005 | Hoover |
| 2005/0238156 A1 | 10/2005 | Turner |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0023747 A1 | 2/2006 | Koren et al. |
| 2006/0026288 A1 | 2/2006 | Acharya |
| 2006/0044407 A1 | 3/2006 | Barbeau |
| 2006/0058049 A1 | 3/2006 | McLaughlin |
| 2006/0068753 A1 | 3/2006 | Karpen |
| 2006/0069503 A1 | 3/2006 | Suomela et al. |
| 2006/0073812 A1 | 4/2006 | Punaganti |
| 2006/0077911 A1 | 4/2006 | Shaffer |
| 2006/0078094 A1 | 4/2006 | Breen |
| 2006/0079236 A1 | 4/2006 | Del Pino |
| 2006/0088152 A1 | 4/2006 | Green |
| 2006/0099935 A1 | 5/2006 | Gallagher |
| 2006/0106774 A1 | 5/2006 | Cohen |
| 2006/0120517 A1 | 6/2006 | Moon |
| 2006/0125692 A1 | 6/2006 | Wang |
| 2006/0128395 A1 | 6/2006 | Muhonen |
| 2006/0135132 A1 | 6/2006 | Cai |
| 2006/0135177 A1 | 6/2006 | Winterbottom |
| 2006/0154665 A1 | 7/2006 | Svensson |
| 2006/0184617 A1 | 8/2006 | Nicholas |
| 2006/0189303 A1 | 8/2006 | Rollender |
| 2006/0193447 A1 | 8/2006 | Schwartz |
| 2006/0205383 A1 | 9/2006 | Rollender |
| 2006/0206568 A1* | 9/2006 | Verma ............... G06Q 10/10 709/206 |
| 2006/0206610 A1 | 9/2006 | Ling |
| 2006/0222151 A1 | 10/2006 | Goldman |
| 2006/0233317 A1 | 10/2006 | Coster |
| 2006/0236258 A1 | 10/2006 | Othmer |
| 2006/0239205 A1 | 10/2006 | Warren |
| 2006/0250987 A1 | 11/2006 | White |
| 2006/0281437 A1 | 12/2006 | Cook |
| 2006/0293024 A1* | 12/2006 | Benco et al. ............... 455/404.2 |
| 2007/0003024 A1 | 1/2007 | Olivier |
| 2007/0019614 A1 | 1/2007 | Hoffman |
| 2007/0021908 A1 | 1/2007 | Jaugilas |
| 2007/0027997 A1 | 2/2007 | Polk |
| 2007/0036139 A1 | 2/2007 | Patel |
| 2007/0040895 A1* | 2/2007 | Barbeau et al. ............ 348/14.01 |
| 2007/0041513 A1 | 2/2007 | Gende |
| 2007/0060097 A1 | 3/2007 | Edge |
| 2007/0081635 A1 | 4/2007 | Croak |
| 2007/0104183 A1 | 5/2007 | Bakke |
| 2007/0115941 A1 | 5/2007 | Patel |
| 2007/0121601 A1 | 5/2007 | Kikinis |
| 2007/0160036 A1 | 7/2007 | Smith |
| 2007/0162228 A1 | 7/2007 | Mitchell |
| 2007/0190968 A1 | 8/2007 | Dickinson |
| 2007/0201623 A1 | 8/2007 | Hines |
| 2007/0202844 A1 | 8/2007 | Wilson |
| 2007/0206568 A1 | 9/2007 | Silver |
| 2007/0206613 A1 | 9/2007 | Silver |
| 2007/0218871 A1 | 9/2007 | Bonner |
| 2007/0238448 A1 | 10/2007 | Gallagher |
| 2007/0242660 A1 | 10/2007 | Xu |
| 2007/0253429 A1 | 11/2007 | James |
| 2007/0263610 A1 | 11/2007 | Mitchell |
| 2007/0263611 A1 | 11/2007 | Mitchell |
| 2007/0270164 A1 | 11/2007 | Maier |
| 2007/0293205 A1 | 12/2007 | Henderson |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0081646 A1 | 4/2008 | Morin |
| 2008/0117859 A1 | 5/2008 | Shahidi |
| 2008/0160953 A1 | 7/2008 | Mia |
| 2008/0192731 A1 | 8/2008 | Dickinson |
| 2008/0208671 A1 | 8/2008 | Ehrlich |
| 2008/0214202 A1 | 9/2008 | Toomey |
| 2008/0268809 A1 | 10/2008 | Busin |
| 2008/0313000 A1 | 12/2008 | Degeratu |
| 2009/0003535 A1 | 1/2009 | Grabelsky |
| 2009/0128404 A1 | 5/2009 | Martino |
| 2009/0198733 A1 | 8/2009 | Gounares |
| 2009/0204471 A1 | 8/2009 | Elenbaas et al. |
| 2009/0204600 A1 | 8/2009 | Kalik |
| 2009/0237210 A1 | 9/2009 | Ciesla |
| 2010/0003954 A1 | 1/2010 | Greene |
| 2010/0010860 A1 | 1/2010 | Bose |
| 2010/0119049 A1 | 5/2010 | Clark |
| 2010/0198933 A1 | 8/2010 | Smith |
| 2010/0233991 A1 | 9/2010 | Crawford |
| 2010/0262668 A1 | 10/2010 | Piett |

(56) References Cited

U.S. PATENT DOCUMENTS

2011/0207429 A1 8/2011 Maier
2012/0079600 A1 3/2012 Kellerman

FOREIGN PATENT DOCUMENTS

| WO | WO2004/025941 | 3/2004 |
|----|---------------|--------|
| WO | WO/2004021726 | 3/2004 |
| WO | WO2005/051033 | 6/2005 |

OTHER PUBLICATIONS

Harry Newton, Newton's Telecom Dictionary, Feb. 2000, Telecom Books, 16$^{th}$ edition, p. 427.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Winterbottom, et al., "GEOPRIV PIDF-Lo Usage Clarification, Considerations and Recommendations; draft-ietf-geopriv-pdif-lo-profile-00.txt," Nortel, Jul. 2, 2005, pp. 1-31.

Berners-Lee, et al., "Uniform Resource Identifier (URI) Generic Standard, Internet Engineering Task Force," Day Software, Jan. 1, 2005, pp. 1-61.

Zehua et al., "On Querying Geospatial and Georeferenced Metadata Resources in G-Portal," IEEE Comp. SOC, May 31, 2003, pp. 245-255.

Peterson et al., "A Presence-based GEOPRIV Location Object Format; rfc4119,txt," Neustar, Dec. 1, 2005, pp. 1-23.

Yilin Ahao, Efficient and reliable date transmission for cellular and GPS based mayday systems, Nov. 1997, IEEE, IEEE Conference on Intelligent Transportation System, 1997. ITSC 97, 555-559.

International Search Report received in PCT/US2012/00266 dated Aug. 3, 3012.

International Search Report received in PCT/US2011/001990 dated Apr. 24, 2012.

International Search Report received in PCT/US2012/067857 dated Feb. 20, 2013.

International Search Report received in PCT/US2012/67689 dated Feb. 22, 2013.

International Search Report received in PCT/US2012/066313 dated Feb. 4, 2013.

\* cited by examiner

EMERGENCY ALERT FOR VOICE OVER INTERNET PROTOCOL (VOIP)

The present application claims priority from U.S. Provisional Application No. 60/711,435, filed Aug. 25, 2005, entitled "Emergency alert For VoIP", to Dickinson et al., the entirety of which is expressly incorporated herein by reference.

BACKGROUND OF THE INVENTION

1. Field of the Invention

This invention relates generally to emergency services. More particularly, it relates to emergency alert (e.g., Emergency alert™ type services) and technology for land-based and/or wireless phones, including and particularly Voice Over Internet Protocol (VoIP) phones.

2. Background of Related Art

Many communities have, or are in the process of, implementing what is known as an emergency alert system. An emergency alert system allows an emergency center to rapidly notify by telephone residents and businesses within a given geographical area affected by any given emergency. The larger the emergency, the larger the affected community and telephones to be notified. Public safety access points (PSAPs) typically employ emergency alert in emergency situations where it is necessary to contact thousands of citizens to alert them of pending or potential dangers such as neighborhood evacuations, tornado warnings, etc.

Current emergency alert systems employ banks of telephone dialers to quickly work through a list of hundreds, and even thousands (or more) telephone numbers, playing an audio recording to each answered phone. Some systems will leave the emergency message on an answering machine if that is what answers the line. Other emergency alert systems will keep track of which telephone numbers in a list are not answered after a predetermined number of rings, and will attempt to redial those numbers a predetermined number of times in an attempt to make contact.

Conventional emergency alert systems are based on the location of land-based (or street address-associated) telephones. For other phones, such as wireless phones, or voice over Internet Protocol (VoIP) phones, the users must register their phone number in the emergency alert system at a given location.

As VoIP promises to become the predominant telecommunications technology in the world, heightened emphasis will be placed on the registration process of VoIP phones to associate those phone numbers with a given location.

The present inventor has appreciated that due to the mobile and otherwise nomadic capabilities of VoIP telephones, however, the challenge of routing 911 calls with adequate automatic location identification (ALI) data to PSAPs is made more difficult. The existing solution to this problem is standardized in the NENA i2 Migratory standard. This standard uses dynamic ALI updates based upon emergency services query keys (ESQKs), and ALI steering, to supply accurate ALI data to a given public safety access point (PSAP) attempting to conduct an emergency alert set of calls. Although this solution is effective in getting 911 calls TO a PSAP, it has inherent problems when the PSAP itself initiates calls to individual telephones in the so-called "emergency alert" scenario.

Most emergency alert solutions today rely upon telephone numbers in an ALI database that are linked with the address where the phone is located. After selecting a particular geographical area, emergency alert solutions determine from the ALI database which telephone numbers are located in that area, and then commence to dial each number one by one. Depending upon how large the region is, and how large the outdialing phone banks are, the notification time can take several minutes to several hours.

However, such conventional solutions have disadvantages with conventional emergency alert systems, mostly because typical wireless and VoIP phones within the affected emergency region may not be included in the emergency alert process. Either the wireless or VoIP phone is not registered with an accurate location (e.g., it may currently not be at the registered location), or they simply might not have a specific telephone number listed in the ALI database, much less a specific current location. And even if it is listed in the ALI database, because many wireless and VoIP phones are mobile, there is no assurance that any particular wireless or VoIP phone may or may not be within the region of concern at the time of the concern.

In a VoIP phone network, the entity that knows the location of a specific VoIP phone is the VoIP positioning center (VPC). In the case of a completely wireless phone (e.g., cellular, WiFI), there may not be any network entity that knows its location. Without assurance that a particular phone is within a given area of concern, or without knowledge of VoIP phone numbers that exist within the given PSAP's jurisdiction, the PSAP cannot reliably issue emergency warnings to these phones.

There is a need for a better emergency alert system capable of quickly and reliably alerting wireless and/or VoIP phones currently within a region affected by a given emergency message.

SUMMARY OF THE INVENTION

In accordance with the principles of the present invention, an apparatus and method to alert a plurality of phones currently located within a given geographical region comprises receiving text data as an emergency alert message passed to a voice over Internet Protocol (VoIP) positioning center (VPC). Information is received defining the given geographical region, passed to the VPC. The text data is converted into voice data. The voice data is routed to each of the large number of phones determined to be within the given geographical region.

A method and apparatus to alert a plurality of phones currently located within a given geographical region in accordance with another aspect of the invention comprises receiving as a first input an emergency alert message passed to a voice over Internet Protocol (VoIP) positioning center (VPC). A second input information is received defining the given geographical region, passed to the VPC. The received emergency alert message is converted into VoIP data. The VoIP data is routed to each of the plurality of phones determined to be within the given geographical region.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present invention implements a voice over Internet Protocol (VoIP) positioning center (VPC) in configuration with support from a text-to-voice module, emergency routing database, and VoIP switching points (VSPs) to allow a public safety access point (PSAP) or other emergency center to effectively communicate the nature of an emergency alert notification and the area of notification to the VoIP positioning center (VPC). The inventive VPC in turn determines which phones (including wireless and/or VoIP phones) are currently in the area for notification, and reliably and quickly issues the required warning to all affected wireless and VoIP phones.

Figure 1:
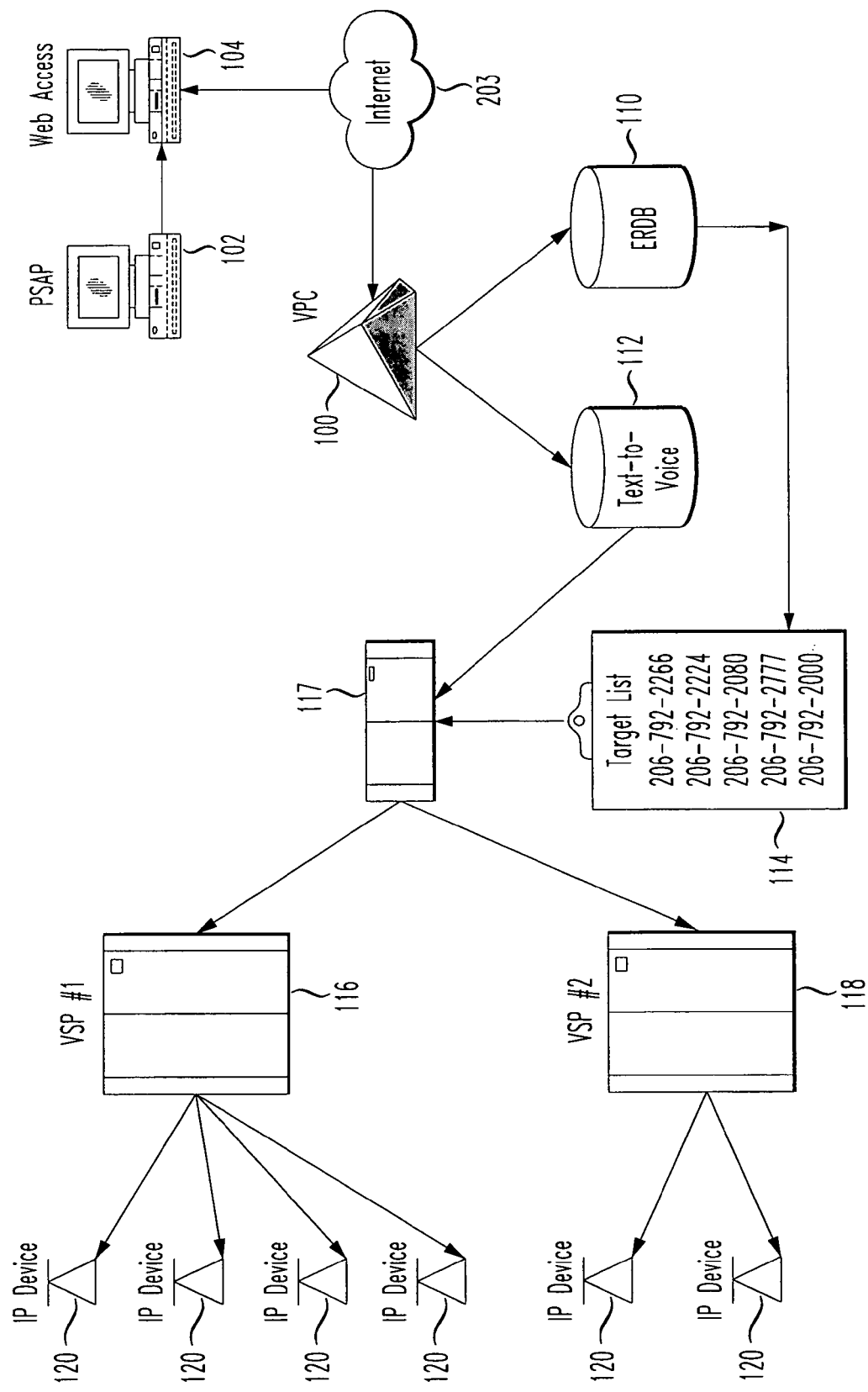
FIG. 1 shows an exemplary emergency alert Voice Over Internet Protocol (VoIP) solution, in accordance with the principles of the present invention.

FIG. 1 shows an exemplary emergency alert Voice Over Internet Protocol (VoIP) solution, in accordance with the principles of the present invention.

In particular, as shown in FIG. 1, emergency alert infrastructure includes a VoIP positioning center (VPC) 100 in communication with a text-to-voice module 112 and emergency routing database 110. Emergency messages are passed from the VPC 100 to the text-to-voice module 112, which routes packetized audio messages to targeted IP devices 120 via appropriate VoIP switching points, or softswitch, (VSPs) 116, 118. The VSPs 116, 118 are a VoIP service provider's equivalent to a landline central office.

The ERDB 110 outputs a target list of phones to be contacted 114, based on geographical definitions provided by the VPC 100. Though the geographical definitions are provided by the VPC 100 in the disclosed embodiments, the geographical definitions may be provided by a separate entity, preferably in communication with and directed by the VPC 100, e.g., over the Internet 203.

The present invention also requires implementation of voice trunks, e.g., CAMA or SS7 voice trunks, provisioned between an emergency services gateway (ESGW) and a selective router.

Also required is an automatic location identification (ALI) database, provisioned per otherwise conventional procedures.

TCP/IP data circuits are provisioned between the VoIP positioning center (VPC) 100 and the ALI database(s).

The VoIP positioning center (VPC) 100 is the call routing "mastermind" that maintains an emergency routing database (ERDB) 110 of VoIP customer addresses. In conventional 911 use, the VPC 100 also determines which PSAP should receive a received emergency call received from a wireless VoIP phone. Location techniques vary, e.g., location determined via which cellular tower the wireless device is communicating over, etc. The specific location technique used to locate a wireless and/or VoIP device is not crucial to the invention, just that the VPC 100 maintain a current location of all VoIP devices within a relevant emergency region. In a conventional 911 direction, the VoIP softswitches 116, 118 rely upon the VPC 100 to determine which selective router should receive a given E911 call. The VPC 100 also communicates with the PSAP 102 to inform the PSAP 102 of the caller's phone number (i.e., callback number) and location defined by a street address (or, in the case of a wireless caller, the closest street address to their current location).

Generally speaking, the inventive call flow traces emergency alert with a PSAP 102 that has determined that an emergency alert is required. In this call flow, the PSAP 102 that has determined the need for an emergency alert accesses a suitable web site 104 that offers a map of the PSAP jurisdiction. The specific drawing technique is not particularly important, as any suitable conventional application useful for emergency alert application may be implemented.

Using such drawing techniques provided by the web site 104, as directed by the PSAP 102 that provides the boundary within which all wireless and/or VoIP phones need to be alerted.

Next, in one disclosed embodiment, the PSAP 102 provides typed text of the alert into a provisioning field offered by a suitable web site page 104. The exact text message is not important to the invention. The text message may be pre-programmed and automatically provided by the PSAP equipment 102, or may be input as text directly by a PSAP operator. In any event, the PSAP 102 submits the completed warning to the VPC 100.

Alternative technology includes having the PSAP 102 contact a network operator at the VPC 100 (or other location) in other manner, e.g., verbally, via e-mail, facsimile (FAX), video (e.g., NTSC, PAL or even over the Internet using a multimedia messaging service (MMS) or similar technology, to describe the emergency alert message and the target area to be alerted.

The VPC 100 overlays the boundary area provided by the PSAP 102 to be alerted with the target list of phones 114 determined by the ERDB and/or other database maintained by the VPC 100 to be currently in the region to be alerted. Based on this overlay, the target list of vulnerable phones 114 is determined.

If textual input was submitted by the PSAP 102, then the textual input is converted into a data stream of packets representing an audible message by the text-to-voice module 112. The text-to-voice module 112 creates data representing an audible recording of the emergency alert message to be sent.

Lastly, an appropriate VoIP outdialing functionality instantly sends the recorded message to all phones on the target list. Because the VoIP dialing is packet based and digital in nature, virtually all wireless and/or VoIP phones to be alerted can be 'dialed', or contacted via Internet Protocol techniques, virtually simultaneously as compared with conventional DTMF dialing banks.

In an alternative embodiment, the target list of phone numbers to be alerted 114, is forwarded back to the PSAP 102, and the PSAP 102 initiates outdialing using otherwise existing emergency alert technology from the PSAP 102.

Figure 2:
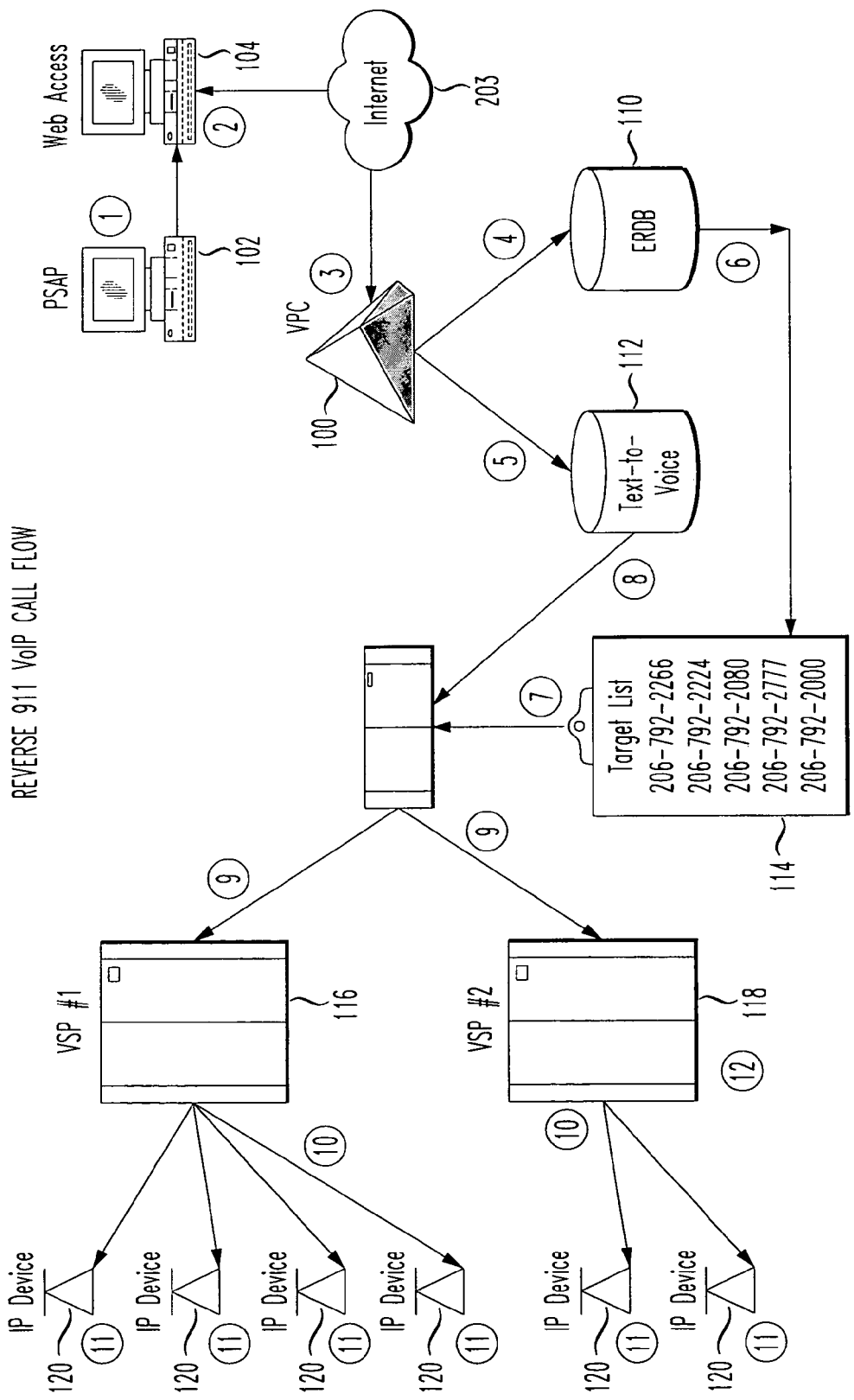
FIG. 2 shows an exemplary call flow for reverse E911 service, in accordance with the principles of the present invention.

FIG. 2 shows an exemplary call flow for emergency alert service, in accordance with the principles of the present invention.

As shown in call flow step 1 of FIG. 2, the PSAP 102 determines that emergency notification is required, and the geographical region to be alerted is identified.

In call flow step 2, the PSAP 102 (or other emergency alert initiator (EAI) accesses the web site 104 of a suitable emergency alert vendor (e.g., www.reverse911.com). Using tools preferably provided by the web site 104, the PSAP 102 provides required input.

In particular, required inputs from an emergency alert initiator (EAI) include:

(1) A geographic boundary outline of the region (or regions) to be alerted. The geographic boundary outline may be defined in an appropriate manner, e.g., defined by a geographic shape such as a polygon, or defined by a civic address element such as street address range, zip code, city, county.

(2) An emergency alert message (EAM). The particular input format of the emergency alert message is unimportant, text or voice. Rather, the emergency alert message is a textual message to be transmitted in audible voice form (e.g., converted text-to-voice) to all wireless and/or VoIP (and even wired) phones within that geographic boundary.

Optional inputs from an emergency alert initiator include:

(3) EXPIRATION (date/time) of the emergency alert message (optional); and (4) RETRY attempts (optional).

Delivery of the emergency alert message is attempted (and re-attempted) according to defined criteria (i.e., either time constrained or frequency constrained or both).

The emergency alert application server preferably provides feedback to the emergency alert initiator as to the success (or failure) of the delivery of the emergency alert message.

In call flow step 3, the boundary information and message text travel via Internet Protocol (IP) to the VPC 100.

In call flow step 4, the VPC 100 routes the geographic boundary of the region(s) to be alerted with an emergency alert message, to the ERDB 110.

In call flow step 5, the VPC 100 routes the alert message text to the text-to-voice converter module 112.

In call flow step 6, the ERDB 110 overlays the geographic boundary provided by the PSAP 102, and selects all wireless and/or VoIP phone numbers currently located within that boundary. These selected wireless and/or VoIP (and even wired) phone numbers create the target list of phone numbers 114.

The emergency alert application server (EAAS) then determines the VoIP users within the database that should receive the emergency alert message (EAM). This list is referred to as containing emergency alert targets.

The EAAS then initiates VoIP signaling to the relevant users. This signaling prompts the users' VoIP devices to establish a voice-path media connection with a suitable service provider so that the emergency alert message can be delivered to each user.

In call flow step 7, the target list of phone numbers 114 is forwarded to a suitable outbound call controller (OCC) 117.

In call flow step 8, the voice message representing the textual message transmitted by the PSAP 102 is forwarded to the outbound call controller 117.

In call flow step 9, the outbound call controller 117 dials each number on the target list of phone numbers to be alerted 114, and appends the alert voice message. Using VoIP, this process typically takes just milliseconds (i.e., all alert phone calls are placed virtually simultaneously).

In call flow step 10, the appropriate VoIP softswitch 116, 118 routes the call to the designated phone 120, be it wireless, VoIP, or even wired.

In call flow step 11, almost simultaneously, thousands of VoIP phones 120 ring, and in the same virtual instant the recorded text-to-voice message is heard by thousands of affected people.

In call flow step 12, the called public responds to the alert message.

The present invention provides a simple technique for quickly and reliably identifying target phones to be alerted in an emergency alert type emergency. The invention expedites contact with the numerous identified target phones, and has the capability to reliably contact many thousands, if not millions of phones in the case of a large-scale emergency, in a short amount of time.

Due to the unique qualities of VoIP, the entire target list of phones to be alerted 114 can be dialed virtually simultaneously and instantly, instead of sequentially and limited to the number of voice trunks implemented by the PSAP or other emergency alert source, as in conventional emergency alert techniques.

Quite simply, the invention saves time, lives and money.

This invention has applicability to wireless telecommunication in general, including long distance carriers, Internet Service Providers (ISPs), and information content delivery services/providers. More particularly, it has applicability to virtually any public service access point (PSAP), their use of location services, and to E-9-1-1 services for Voice Over Internet Protocol (VoIP).

While the invention has been described with reference to the exemplary embodiments thereof, those skilled in the art will be able to make various modifications to the described embodiments of the invention without departing from the true spirit and scope of the invention.

What is claimed is:

1. A method to alert a plurality of phones currently located within a given geographic region, comprising:

receiving an emergency alert message passed to a voice over Internet Protocol (VoIP) positioning center (VPC) in communication with at least one automatic location identification (ALI) database;

receiving, at said VPC, a given geographic region to be alerted;

determining a target plurality of destination phones to be contacted based on a match of a digitally stored current location of each of a plurality of VoIP phones in said VPC, to said given geographic region;

passing, from said VPC, said emergency alert message to those of said target plurality of destination phones determined to have a digitally stored current location that is within said given geographic region; and retrying an unsuccessful attempt to pass said emergency alert VoIP data to any given one of said target plurality of destination phones.

2. The method to alert a plurality of phones currently located within a given geographic region according to claim 1, wherein:

said VPC determines which phones are in said target plurality of destination phones to be alerted.

3. The method to alert a plurality of phones currently located within a given geographic region according to claim 2, wherein:

said VPC determines which phones are in said target plurality of destination phones to be alerted, using an emergency routing database (ERDB).

4. The method to alert a plurality of phones currently located within a given geographic region according to claim 1, wherein:

said plurality of destination phones are voice over Internet Protocol (VoIP) phones.

5. The method to alert a plurality of phones currently located within a given geographic region according to claim 1, wherein:

said emergency alert message comprises text message data.

6. The method to alert a plurality of phones currently located within a given geographic region according to claim 1, wherein:

said text message data is passed to said VPC via an Internet.

7. The method to alert a plurality of phones currently located within a given geographic region according to claim 1, wherein:

said given geographic region is passed to said VPC via an Internet.

8. A method to alert a plurality of phones currently located within a given geographic region, comprising:

receiving an emergency alert message passed to a voice over Internet Protocol (VoIP) positioning center (VPC) in communication with at least one automatic location identification (ALI) database;

receiving, at said VPC, a given geographic region to be alerted;

determining a target plurality of destination phones to be contacted based on a match of a digitally stored current location of each of a plurality of VoIP phones in said VPC, to said given geographic region;

converting said received emergency alert message into emergency alert VoIP data;

passing, from said VPC, said emergency alert VoIP data to each of those of said target plurality of destination phones determined to have a digitally stored current location that is within said given geographic region; and retrying an unsuccessful attempt to pass said emergency alert VoIP data to any given one of said target plurality of destination phones.

9. The method to alert a plurality of phones currently located within a given geographic region according to claim 8, further comprising:

receiving an expiration time of said received emergency alert message.